(12) United States Patent
Akizuki (10) Patent No.: US 10,265,981 B2
(45) Date of Patent: Apr. 23, 2019

(54) PRINTING APPARATUS AND CONTROL METHOD FOR PRINTING APPARATUS

(71) Applicant: SEIKO EPSON CORPORATION, Tokyo (JP)

(72) Inventor: Masayuki Akizuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/815,108

(22) Filed: Nov. 16, 2017

(65) Prior Publication Data

US 2018/0141358 A1    May 24, 2018

(30) Foreign Application Priority Data

Nov. 18, 2016  (JP) ................. 2016-224793

(51) Int. Cl.
| | |
|---|---|
| *B41J 29/393* | (2006.01) |
| *B41J 29/387* | (2006.01) |
| *B41J 29/13* | (2006.01) |
| *B41J 29/38* | (2006.01) |
| *B41J 3/44* | (2006.01) |
| *H04N 1/00* | (2006.01) |

(52) U.S. Cl.
CPC ............ *B41J 29/393* (2013.01); *B41J 3/44* (2013.01); *B41J 29/13* (2013.01); *B41J 29/38* (2013.01); *B41J 29/387* (2013.01); *H04N 1/0009* (2013.01); *H04N 1/00037* (2013.01); *H04N 1/00074* (2013.01)

(58) Field of Classification Search
CPC ... B41J 29/393; B41J 29/38; B41J 3/44; B41J 29/387; B41J 29/13; H04N 1/00037; H04N 1/00074; H04N 1/0009
USPC ............................................ 347/5, 9, 14, 19
See application file for complete search history.

(56) References Cited

U.S. PATENT DOCUMENTS

2018/0063339 A1*  3/2018  Pantin ................ H04N 1/00037

FOREIGN PATENT DOCUMENTS

JP         2009-196307 A     9/2009

* cited by examiner

*Primary Examiner* — Jannelle M Lebron
(74) *Attorney, Agent, or Firm* — Foley & Lardner LLP (57) ABSTRACT

A printer includes a detection unit configured to detect an error, a storage unit configured to store in itself error information corresponding to the error, a communication unit configured to communicate with an external apparatus, a printing unit configured to perform printing on a printing medium, and a control unit.

3 Claims, 6 Drawing Sheets

PRINTING APPARATUS AND CONTROL METHOD FOR PRINTING APPARATUS

BACKGROUND

1. Technical Field

The present invention relates to a printing apparatus and a control method for a printing apparatus.

2. Related Art

Heretofore, with respect to printing apparatuses (printers), a printing apparatus configured to, upon occurrence of an error, print a message indicating a coping method for the error has been known (see, for example, JP-A-2009-196307).

In the above-mentioned printing apparatus disclosed in JP-A-2009-196307, however, when an error occurs, a message indicating a coping method for the error may be printed at an unintended timing for a user, and thus, the user may misunderstand that there is no error occurrence because the printing apparatus maintains execution of printing. Further, in the case where an occurred error is an error that disables the printing by the printing apparatus, no message indicating a coping method for the error is printed, and thus, a problem in that the user does not know the coping method arises.

SUMMARY

An advantage of some aspects of the invention is that a printing apparatus and a control method for a printing apparatus are provided that enable information in relation to an occurred error to be output at an appropriate timing in a method based on the kind of the occurred error.

In order to achieve the advantage, a printing apparatus according to an aspect of the invention includes a detection unit configured to detect an error, a storage unit configured to store in itself error information corresponding to the error, a communication unit configured to communicate with an external apparatus, a printing unit configured to perform printing on a printing medium, and a control unit. Further, upon detection of an error by the detection unit, the control unit moves to a first state in which the communication unit receives a first command and does not receive a second command. Further, upon reception of the first command by the communication unit in the first state, the control unit determines whether the detected error is a first error that does not disable the printing or a second error that disables the printing. Further, in the case where a result of the determination is that the detected error is the first error, the control unit acquires the error information from the storage unit and allows the printing unit to print the error information, and in the case where a result of the determination is that the detected error is the second error, the control unit acquires the error information from the storage unit and allows the communication unit to transmit the error information to the external apparatus.

With this configuration, upon occurrence of an error, the printing apparatus enables, without automatically printing the error information, the printing of the error information to be executed at timing when the printing apparatus has received the first command from the external apparatus, on the basis of an instruction by a user. Further, the printing apparatus enables the error information to be output in a method based on which of the first error and the second error the error is.

Further, in the above printing apparatus, the error information may include a coping method for the detected error.

With this configuration, a user is able to simply and precisely recognize a coping method for the detected error and cope with the detected error, by referring to the printed error information.

Further, in the above printing apparatus, the error information may include log information in relation to the detected error.

With this configuration, a user is able to simply and precisely recognize the log information in relation to the detected error and execute a coping process, by referring to the printed error information.

Further, in the above printing apparatus, upon detection of recovery from the detected error by the detection unit, the control unit may move to a second state in which the communication unit receives the first command and the second command. Further, upon reception of the second command by the communication unit in the second state, the control unit may acquire the log information from the storage unit, and may allow the printing unit to print the log information or may allow the communication unit to transmit the log information to the external apparatus.

With this configuration, after the elimination of the error of the printing apparatus, a user is able to simply and precisely recognize logs in relation to the eliminated error.

In order to achieve the advantage, a control method according to another aspect of the invention and being for use in a printing apparatus including a control unit for performing printing on a printing medium includes, upon detection of an error, allowing the printing apparatus to move to a first state in which a first command is received and a second command is not received. Further, in the control method, upon reception of the first command in the first state, it is determined whether the detected error is a first error that does not disable the printing or a second error that disables the printing. In the case where a result of the determination is that the detected error is the first error, error information corresponding to the detected error is acquired, and is printed by the printing unit, and in the case where a result of the determination is that the detected error is the second error, the error information is acquired and transmitted to an external apparatus.

With this configuration, upon occurrence of an error, the printing apparatus enables, without automatically printing the error information, the printing of the error information to be executed at timing when the printing apparatus has received the first command from the external apparatus, on the basis of an instruction by a user. Further, the printing apparatus enables the error information to be output in a method based on which of the first error and the second error the error is.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
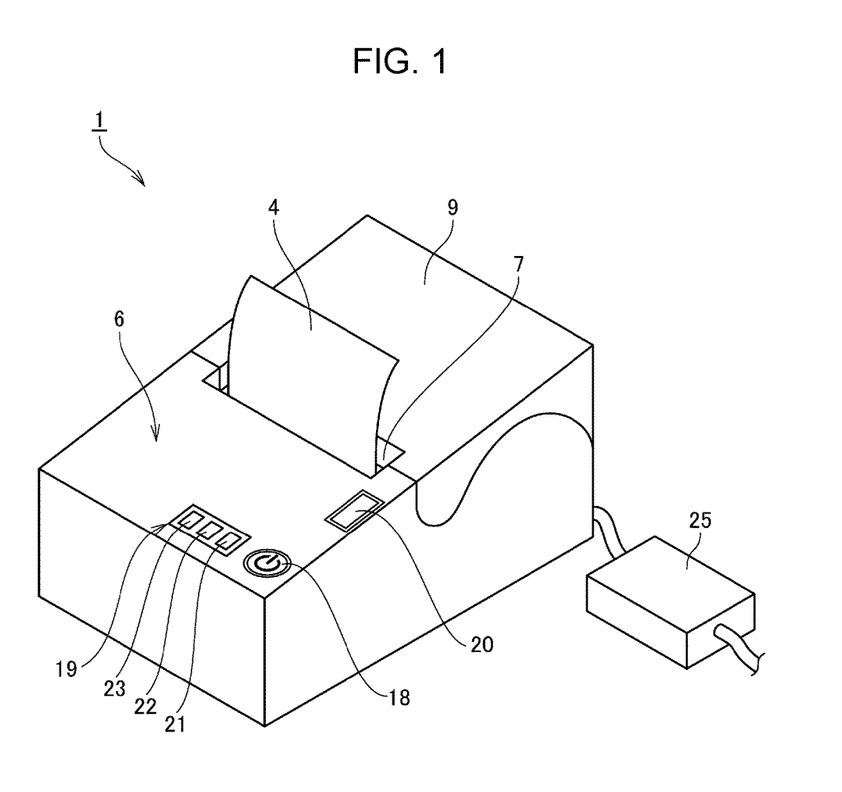
FIG. 1 is an external perspective view of a printer.
Figure 2:
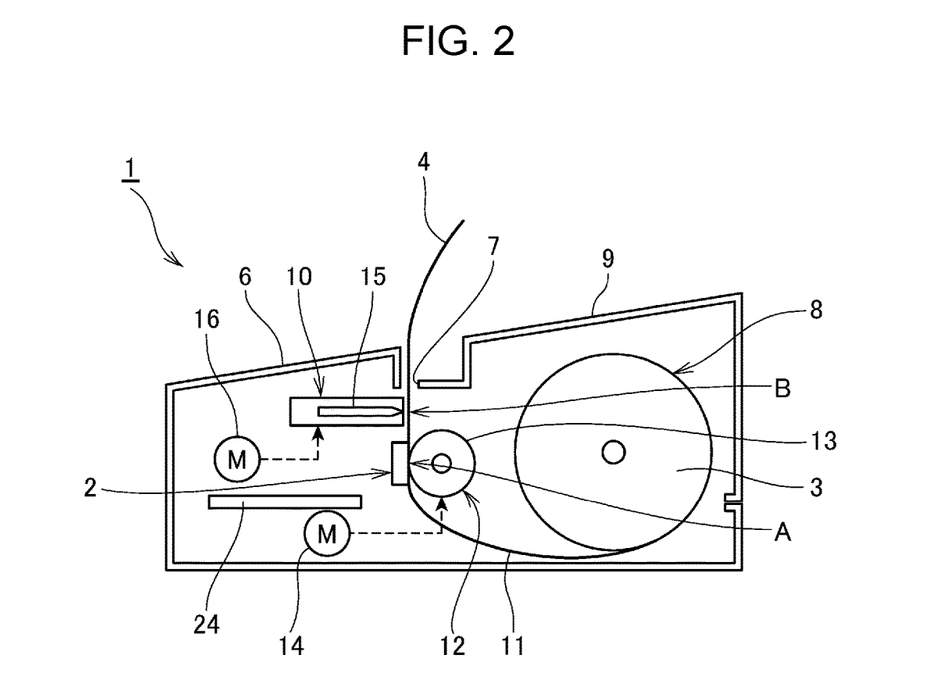
FIG. 2 is a diagram illustrating an internal structure of the printer.

FIG. 1 is an external perspective view of a printer 1 (the printing apparatus), to which the invention is applied. FIG. 2 is a diagram illustrating an internal structure of the printer 1 shown in FIG. 1. As shown in FIGS. 1 and 2, the printer 1 in this example is installed on a register counter in a shop, or the like, and issues receipts and the like. The printer 1 is an apparatus having the functions of containing roll paper 3 (the "printing medium"); transporting the roll paper 3 having been contained; allowing a thermal head 2 to print an image on the roll paper 3 having been transported; and cutting the roll paper 3.

As shown in FIGS. 1 and 2, the printer 1 includes a housing 6, a paper discharge outlet 7, and an opening/closing door 9. The paper discharge outlet 7 is disposed on the top face of the housing 6, and the roll paper 3 is allowed to be discharged through this paper discharge outlet 7. The opening/closing door 9 is disposed adjacent to and at the rear side of the paper discharge outlet 7 in a top portion of the housing 6, and opens/closes a roll-paper container chamber 8. This roll-paper container chamber 8 is disposed inside the housing 6. In the inside of the housing 6, there are also disposed a transport mechanism 12, a thermal head 2, an auto-cutter 10, and a control substrate 24. The roll paper 3 is transported by the transport mechanism 12 along a transport path 11 in the inside of the housing 6. This transport path 11 is a path starting from the roll-paper container chamber 8, passing through a printing position A and a cutting position B in this order, and reaching the paper discharge outlet 7. The roll paper 3 is subjected to the printing by the thermal head 2 at the printing position A, and then is cut by the auto-cutter 10 at the cutting position B. The control substrate 24 includes a CPU and a memory that are mounted thereon.

The transport mechanism 12 includes a platen roller 13 and a transport motor 14, and the transport motor 14 drives the platen roller 13. The roll paper 3 is transported in a state of being pinched between the thermal head 2 and the platen roller 13. The auto-cutter 10 includes a movable blade 15 and a cutter motor 16, and the cutter motor 16 drives the movable blade 15. With the driving of the cutter motor 16, the movable blade 15 is moved between a protruding position and a waiting position. At the protruding position, a blade portion of the movable blade 15 is allowed to protrude into the transport path 11 and cut the roll paper 3. At the waiting position, the blade portion of the movable blade 15 waits in a state of being moved away from the transport path 11.

Further, as shown in FIG. 1, the printer 1 includes a power switch 18, a display unit 19, and a feed button 20 (an input portion) on the upper face of the housing 6. The power switch 18 is a switch for performing turn on/off of power supplied to the printer 1. The display unit 19 includes a first LED 21, a second LED 22, and a third LED 23. The first LED 21 is lighted on in a state in which the power is tuned on, and is lighted off upon turn-off of the power. The second LED 22 is lighted off in a state in which the roll paper 3 exists on the transport path 11, and is lighted on in a state in which the roll paper 3 does not exist on the transport path 11. The third LED 23 is blinked upon occurrence of one of predetermined errors. Here, there is a plurality of blink patterns in the blink of the third LED 23, and the third LED 23 is blinked with one of the blink patterns that is associated with the occurred error.

The feed button 20 is a button that is operated to allow the roll paper 3 to be fed by a predetermined amount of distance. That is, every time the feed button 20 is pressed down once, the transport motor 14 is driven by a predetermined driving amount, thereby causing the roll paper 3 to be transported by a predetermined transport amount.

Here, the supply of the power to the printer 1 is made via a power adapter 25, and this power adapter 25 is attachably/detachably connected to the printer 1. Further, the printer 1 is communicably connected to a host apparatus 100 (see FIG. 3) (the external apparatus), such as a cash register.

Upon supply of printing data, such as settlement information, from the host apparatus 100, the printer 1 drives the transport motor 14 and thereby allows the transport mechanism 12 to transport the roll paper 3 along the transport path 11 at a constant speed. Concurrently with this operation, the printer 1 drives the thermal head 2 and thereby allows the thermal head 2 to perform printing on a record-paper portion included in the roll paper 3 and passing through the printing position A. Moreover, upon completion of the printing of the printing data, the printer 1 transports a portion located on the roll paper 3 and having been subjected to the printing to a portion on the downstream side of the cutting position B, and allows the auto-cutter 10 to cut the roll paper 3 by driving the cutter motor 16. With these operations, the printer 1 issues a receipt.

The thermal head 2, the transport mechanism 12, and any other component in relation to printing correspond to the "printing unit configured to perform printing on a printing medium".

According to the above description, the printer 1 according to the present embodiment does not include a display panel capable of displaying information, such as a liquid crystal display panel or an organic EL panel. In this way, the downsizing, power consumption reduction, and price reduction of the printer 1 are achieved.

Figure 3:
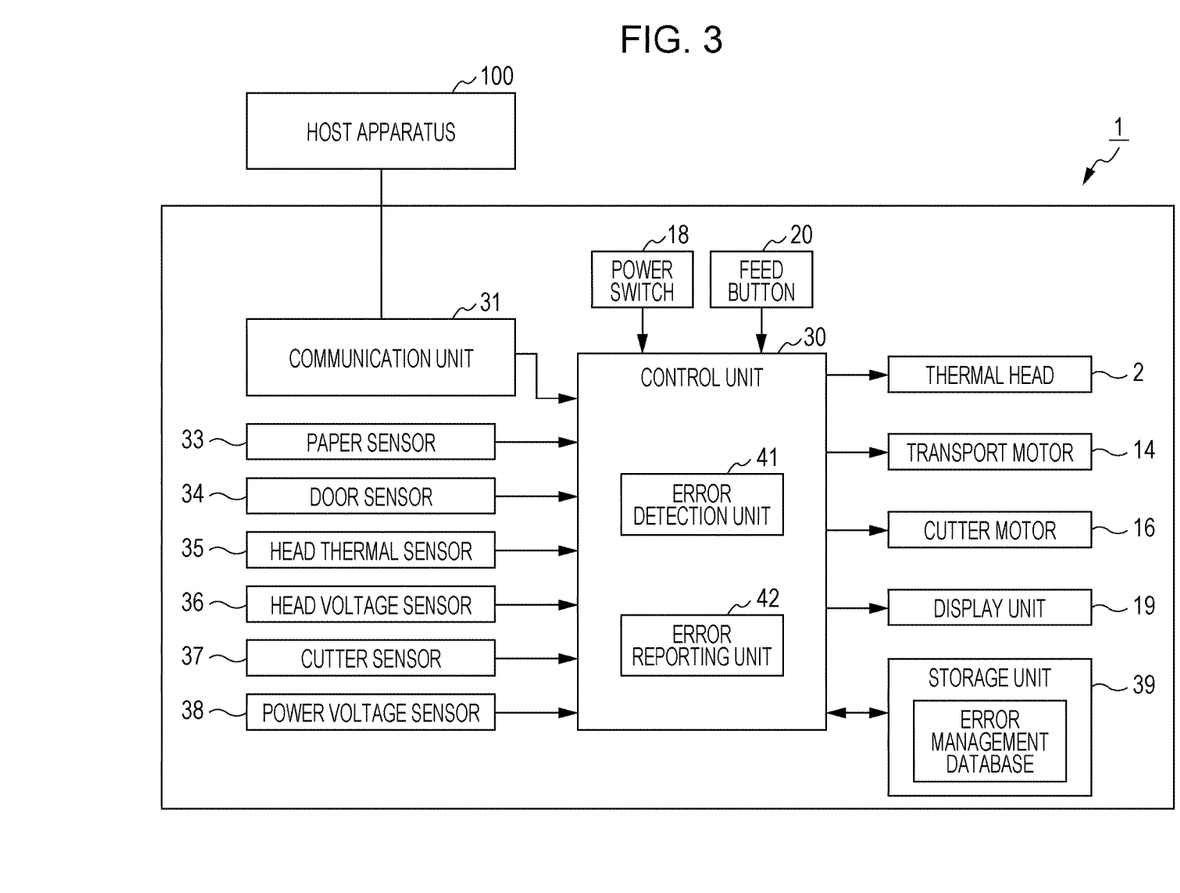
FIG. 3 is a schematic block diagram of a control system of the printer.

FIG. 3 is a schematic block diagram of a control system of the printer 1. The control system of the printer 1 is configured to allow a control unit 30 to serve as the center of the control system. The control unit 30 includes a CPU and a memory, and is mounted on the substrate 24. The input side of the control unit 30 is connected to a communication unit 31, the power switch 18, and the feed button 20. The communication unit 31 performs communication with the host apparatus 100. Moreover, the input side of the control unit 30 is connected to various sensors, that is, a paper sensor 33, a door sensor 34, a head thermal sensor 35, a head voltage sensor 36, a cutter sensor 37, and a power voltage sensor 38 in the present example. The output side of the control unit 30 is connected to the thermal head 2, the transport motor 14, the cutter motor 16, and the display unit 19 via unillustrated drivers. Further, the control unit 30 is connected to a storage unit 39. This storage unit 39 is a rewritable nonvolatile memory. An error management database DB1 is stored in the storage unit 39. This error management database DB1 will be described later.

The paper sensor 33 detects the presence/absence of the roll paper 3 at a portion on the upstream side of the printing position A. The paper sensor 33 mechanically or optically detects the roll paper 3 existing on the transport path 11. The door sensor 34 mechanically or optically detects a state in which the opening/closing door 9 is positioned at a closing position at which the opening/closing door 9 contains the roll-paper container chamber 8. The head sensor 35 detects the temperature of the thermal head 2. The head voltage sensor 36 detects the variation of the voltage of the thermal head 2. This voltage of the thermal head 2 varies due to the variation of the resister value of each of heat generator elements of the thermal head 2. The cutter sensor 37 detects whether or not the movable blade 15 exists on the waiting position. The power voltage sensor 38 detects the voltage of the power supplied to the printer 1 from the outside.

The control unit 30 includes an error detection unit 41 (the detection unit) and an error reporting unit 42.

Each of the error detection unit 41 and the error reporting unit 42 executes processing in a form that allows hardware and software to collaborate with other, that is, for example, in a form that allows a CPU to retrieve a control program (firmware or the like) stored in a memory and execute the control program.

Upon supply of printing data from the host apparatus 100 or the like, the control unit 30 drives the transport motor 14 and the thermal head 2 to perform printing of an image based on the printing data on the roll paper 3. Further, the control unit 30 drives the cutter motor 16 to cut a portion constituting the roll paper 3 and having been located at the cutting position B. Moreover, the control unit 30 totalizes operating time, printing time, the number of printing operations in each of which printing based on printing data has been executed, the number of paper feeding lines for each of which recording paper has been transported, cutter operating time, and the like, and then, stores pieces of data resulting from the totalization into the storage unit 39 as operation logs. Further, upon pressing down of the feed button 20, the control unit 30 drives the transport motor 14 by a predetermined driving amount and thereby allows the transport mechanism 12 to transport the roll paper 3 by a predetermined transport amount.

The error detection unit 41 detects the occurrence of an error on the basis of a value output to the control unit 30 by each of the sensors 33 to 38.

When a value output by the paper sensor 33 is a value indicating a state in which the roll paper 3 does not exist on the transport path 11, the error detection unit 41 detects a paper absence error. When the paper absence error occurs, since the roll paper 3 does not exist on the transport path 11, printing by the printer 1 is disabled.

When a value output by the door sensor 34 is a value indicating that the opening/closing door 9 is not located at the closing position, but is located at an opening position, the error detection unit 41 detects a door error. When the door error occurs, the rolling of the roll paper 3 inside the roll-paper container chamber 8 is unstable due to a situation where the opening/closing door 9 is not closed, and as a result, a failure may occur in the transport of the roll paper 3.

Further, the roll paper 3 is transported in a state of being pinched between the thermal head 2 and the platen roller 13. Since the platen roller 13 is secured to the opening/closing door 9, when the door sensor 34 detects the door error, the opening/closing door 9 is located at the opening position, and thus, the platen roller 13 is also located at a position away from the thermal head 2 and the roll paper 3. Under this situation, the thermal head 2 is not capable of coming contact with the roll paper 3, and thus, is not capable of performing printing. Moreover, at this time, the roll paper 3 is not in the state of being pinched between the thermal head 2 and the platen roller 13, and thus, the transport by the platen roller 13 is also disabled.

Note that, in the case where an ink jet method is employed, an ink jet head, a platen, and the like are not secured to an opening/closing door, and thus, even when a door error indicating that the opening/closing door is in an opening state occurs, printing is not disabled.

Further, when a value output by the head temperature sensor 35 is higher than a predetermined reference temperature, the error detection unit 41 detects a head high-temperature error. When the head high-temperature error occurs, the thermal head 2 may be broken due to the high temperature. Here, the reference temperature is a temperature that has a margin relative to a limit temperature at which the thermal head 2 is actually broken, and that is lower than the limit temperature.

Further, when a value output by the head voltage sensor 36 is not within a predetermined range, the error detection unit 41 detects a head voltage error. When the head voltage error occurs, a failure may occur in the heat generator elements of the thermal head 2. For example, when a head voltage higher than or equal to a reference voltage is applied, dot missing may occur in printing.

Further, when, although the cutter motor 16 has been driven during a predetermined period, no movement of the movable blade 15 from the waiting position has been detected, the error detection unit 41 detects a cutter error in accordance with a value output by the cutter sensor 37. When the cutter error occurs, the auto-cutter 10 may be incapable of cutting the roll paper 3.

Further, when a value output by the power voltage sensor 38 is not within a predetermined range, the error detection unit 41 detects a power voltage error. When the power voltage error occurs, for example, a power adapter that does not comply with a product specification for the power adapter 25 may be currently used because of erroneous use of the power adapter different from the power adapter 25, and thus, a failure may occur in the printer 1.

Further, the error detection unit 41 monitors the memory included in the control unit 30, and detects a memory error when inconsistency occurs in the memory. When the memory error occurs, false operation may occur in the printer 1.

In the above, with respect to errors detected by the error detection unit 41, the paper absence error, the door error, the head high-temperature error, the head voltage error, the cutter error, the power voltage error, and the memory error have been described as examples. An example of cases where errors among the above-exemplified errors disable the printing is a case where the paper absence error occurs. At this time, during a period until the elimination of the paper absence error, the control unit 30 inhibits printing, and as a result, printing by the printer 1 is disabled. The door error also disables the printing.

Hereinafter, an error that, upon occurrence of the error, disables the printing by the printer 1 will be referred to as an "error that disables printing". The error that disables printing corresponds to the "second error".

Meanwhile, even in a state in which any one of the head high-temperature error, the head voltage error, the cutter error, the power voltage error, and the memory error is occurring, under a certain condition where, for example, a factor causing the relevant error is within a range of a margin, or a printing target requires printing in only texts and has a small printing amount, the printer 1 is capable of driving the thermal head 2 and the transport motor 14, and thus is capable of performing the printing. For example, in the case of the cutter error, the printing itself by the thermal head 2 and the platen roller 13 can be executed without any trouble. Hereinafter, an error that, upon occurrence of the error, does not disable the printing by the printer 1 will be referred to as an "error that does not disable printing". The error that does not disable printing corresponds to the "first error".

Further, after an error has occurred, upon elimination of the error, the error detection unit 41 detects the elimination of the error on the basis of an input from a corresponding sensor, or the like.

Upon detection of the occurrence of an error and upon detection of the elimination of the error, the detection unit 41 updates the error management database DB1 in a way described below.

Figure 4:
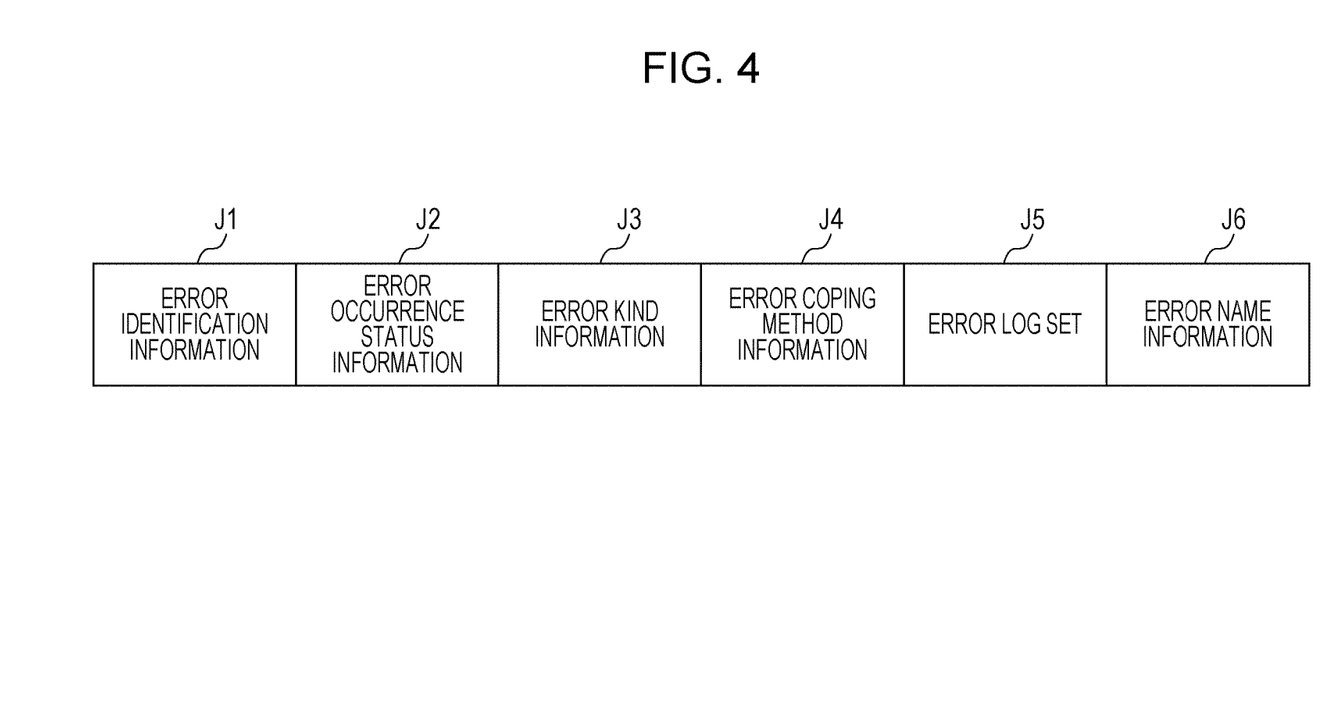
FIG. 4 is a diagram illustrating information included in one record set of an error management database.

FIG. 4 is a diagram schematically illustrating information included in one record set of the error management database DB1.

The error management DB1 includes record sets each associated with a corresponding one of errors that may occur in the printer 1. As shown in FIG. 4, one record set of the error management database DB1 includes error identification information J1, error occurrence status information J2, error kind information J3, error coping method information J4, an error log set J5, and error name information J6.

The error identification information J1 is information for identifying a relevant error, and is assigned with a specific value for each error.

The error occurrence status information J2 is information indicating the presence/absence of the occurrence of a relevant error, and takes either a value indicating a state in which an error is occurring (this value being referred to as a "value indicating presence of the occurrence of a relevant error" hereinafter, or a value indicating a state in which the relevant error is not occurring (this value being referred to as a "value indicating absence of the occurrence of a relevant error" hereinafter).

The error kind information J3 is information indicating a kind of a relevant error, and takes either a value indicating that the kind of a relevant error is the error that disables printing (this value being referred to as a "value indicating the error that disables printing" hereinafter), or a value indicating that the kind of the relevant error is the error that does not disable printing (this value being referred to as a "value indicating the error that does not disable printing" hereinafter).

The error coping method information J4 is information that, upon occurrence of an error, indicates one or more coping methods to be applied to eliminate the occurred error (each of these coping methods being referred to as an "error coping method" hereinafter). An example of the error coping method information J4 is text data in which the one or more coping methods to be applied to eliminate the occurred error are written in texts.

Note that the elimination of an error corresponds to the recovery from the error.

The error coping method is a specific instruction for allowing a corresponding error to be recovered. An example of an error coping method for allowing the head high-temperature error to be recovered is an instruction such as "Restart printing after a brief interval, please". An example of an error coping method for allowing the head voltage error to be recovered is an instruction such as "Replace the thermal head, please". An example of an error coping method for allowing the cutter error to be recovered is an instruction such as "Repair the cutter, please". An example of an error coping method for allowing the power voltage error to be recovered is an instruction such as "Confirm that a proper power adapter is used, please". An example of an error coping method for allowing the memory to be recovered is an instruction such as "Replace the control substrate, please".

The error log set J5 is a set of logs of a relevant error. The logs of an relevant error are pieces of information that indicate, in time-series order, the dates and times of the occurrences of the relevant error and the dates and times of the eliminations of the relevant error. An example of the logs of a relevant error that are included in the error log set J5 is a piece of text data in which the date and time of the occurrence of the relevant error is written in texts.

The error name information J6 is information indicating the name of a relevant error.

One record set corresponding to one error includes a piece of error identification information J1 for identifying the one error; a piece of error occurrence status information J2 indicating the presence/absence of the one error; a piece of error kind information J3 indicating the kind of the one error; one or more pieces of error coping method information J4 in relation to one or more coping methods for the one error; an error log set J5 in relation to one or more logs of the one error; and a piece of error name information J6 indicating the name of the one error. Here, the error log set J5 in relation to one or more logs of the one error is a set of one or more pieces of information each indicating the date and time of the occurrence or elimination of the one error.

Upon detection of the occurrence of an error, the detection unit 41 executes the following processes.

That is, the error detection unit 41 specifies the occurred error, and acquires a piece of error identification information J1 corresponding to the occurred error.

Next, the error detection unit 41 refers to the error management database DB1, and thereby specifies a record set that is among record sets of the relevant database and that includes a piece of error identification information J1 having the same value as that of the acquired piece of error identification information J1. The record set having been specified here is a record set corresponding to the occurred error.

Next, the error detection unit 41 changes the value of a piece of error occurrence status information J2 included in the specified record set into the value indicating presence of the occurrence of a relevant error from the value indicating absence of the occurrence of a relevant error.

Next, the error detection unit 41 detects the date and time of the occurrence of the error (the date and time being, for example, the combination of a set of date, month, and year, and a clock time). Although omitted from illustration, an RTC (real-time clock) is mounted on the control substrate 24, and a piece of data indicating a date and time is input from the RTC to the control unit 30 as needed. The error detection unit 41 detects the date and time of the occurrence of an error on the basis of the piece of data having been input from the RTC. With respect to the method of detecting the date and time of the occurrence of an error, any method may be employed.

Next, the error detection unit 41 additionally writes, in time-series order, a piece of information indicating the date and time of the occurrence of the detected error into an error log set J5 included in the specified record set.

Upon detection of the elimination of an error, the detection unit 41 executes the following processes.

That is, the error detection unit 41 specifies the eliminated error, and acquires a piece of error identification information J1 corresponding to the eliminated error.

Next, the error detection unit 41 refers to the error management database DB1, and thereby specifies a record set that is among the record sets of the relevant database and that includes a piece of error identification information J1 having the same value as that of the acquired piece of error identification information J1.

The record set having been specified here is a record set corresponding to the eliminated error.

Next, the error detection unit 41 changes the value of a piece of error occurrence status information J2 included in the specified record set into the value indicating absence of the occurrence of a relevant error from the value indicating presence of the occurrence of a relevant error.

Next, the error detection unit 41 detects the date and time of the elimination of the error.

Next, the error detection unit 41 additionally writes, in time-series order, a piece of information indicating the date and time of the elimination of the detected error into an error log set J5 included in the specified record set.

Upon detection of an error by the error detection unit 41, the error reporting unit 42 reports the occurrence of the error by driving the display unit 19. That is, upon detection of the paper absence error, the error reporting unit 42 drives and lights the second LED 22. Upon detection of an error among the door error, the head high-temperature error, the head voltage error, the cutter error, the power voltage error, and the memory error, the error reporting unit 42 blinks the third LED 23 with a blink pattern corresponding to the detected error.

Next, the operation of the printer 1 when an error has occurred will be described.

Figure 5:
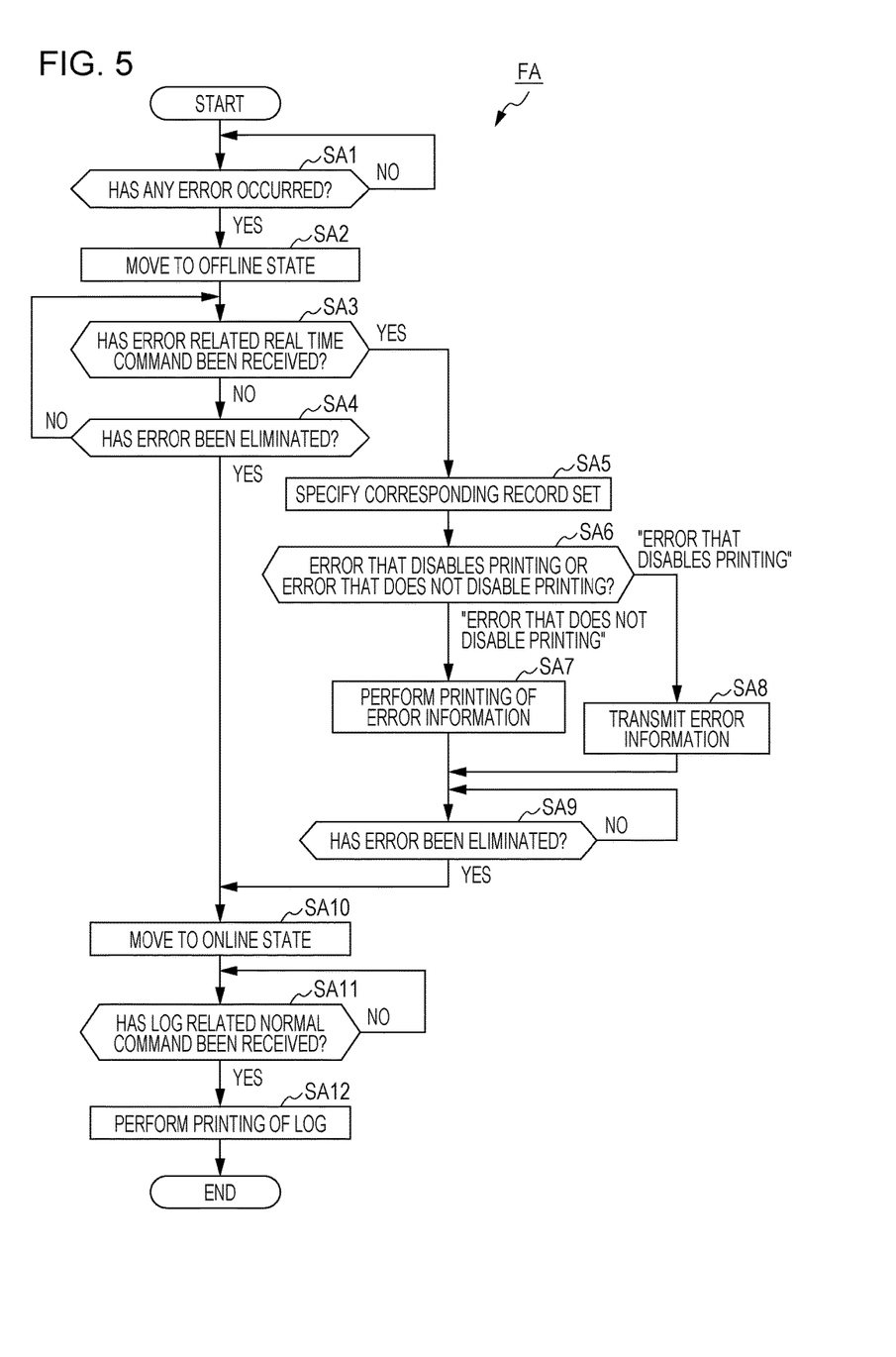
FIG. 5 is a flowchart illustrating operation of the printer.

A flowchart FA in FIG. 5 is a flowchart illustrating the operation of the printer 1. Here, at the time of starting of the flowchart FA, the operation state of the printer 1 is an online state (described later).

As shown in FIG. 5, the control unit 30 of the printer 1 monitors whether or not the occurrence of an error has been detected by the error detection unit 41 (step SA1).

In the case where an error has been detected by the error detection unit 41 (step SA1: YES), the control unit 30 moves the operation state of the printer 1 from the operation state (the "second state") to an offline state (the "first state") (step SA2).

Hereinafter, the error having been detected by the error detection unit 41 in step SA1 will be referred to as a "detected error" when needed.

The online state is a state in which the printer 1 is capable of receiving both of a normal command (the "second command") and a real-time command (the "first command") from the host apparatus 100. Upon reception of the normal command in the online state, the control unit 30 executes processing on the basis of the received normal command, and upon reception of the real-time command in the online state, the control unit 30 executes processing on the basis of the received real-time command.

The real-time command is a control command for instructing the execution of processing having a higher priority than that of processing based on the normal command. When having received the real-time command from the host apparatus 100, even in a case where one or more already-received unexecuted normal commands exist, the control unit 30 gives a high priority to the real-time command, compared with a priority given to each of the one or more unexecuted commands, and executes processing based on the real-time command.

Further, the offline state is a state in which the printer 1 notifies the host apparatus 100 of a status where the printer 1 is in a state of being normally incapable of receiving commands. In the offline state, the printer 1 receives the real-time command as a particular process, whereas the printer 1 does not receive the normal command. The above phrase "the printer 1 does not receive the normal command" means that any normal command having been transmitted to the printer 1 by the host apparatus 100 is, for example, rejected by the printer 1 and, as a result, does not become a processing target in the printer 1.

Further, when the control unit 30 has moved its operation state from the online state to the offline state, the control unit 30 notifies the host apparatus 100 of the movement to the offline state by controlling the communication unit 31 and thereby communicating with the host apparatus 100.

Upon reception of the notification for notifying the movement to the offline state, the host apparatus 100 executes the following processes. That is, during a period while the printer 1 is in the offline state, the host apparatus 100 stops the transmission of the normal command to the printer 1, and moves to a state of being capable of transmitting only the real-time command to the printer 1. Moreover, the host apparatus 100 inquires of a user whether or not printing of information in relation to a detected error that is the cause of the movement to the offline is to be performed. The inquiry may be made using any method. For example, the host apparatus 100 makes the inquiry by displaying a user interface having information in relation to the inquiry on a display means, such as a display panel. Upon reception of an input for instructing that the information in relation to the detected error that is the cause of the movement to the offline is to be performed, the host apparatus 100 generates a real-time command for instructing the execution of the information in relation to the detected error (this real-time command being referred to as an "error related real-time command"), and transmits the generated error related real-time command to the printer 1.

After the movement to the offline state, the control unit 30 monitors whether or not the error related real-time command has been received (step SA3), and concurrently therewith, monitors whether or not the elimination of the detected error has been detected by the error detection unit 41 (step SA4).

In the case where the error related real-time command has not been received (step SA3: NO) and the elimination of the detected error has been detected by the error detection unit 41 (step SA4: YES), the control unit 30 allows the processing procedure to proceed to step SA10. Processes of step SA10 and subsequent steps will be described later.

In the case where, before the detected error is not eliminated (step SA4: NO), the error related real-time command has been received (step SA3: YES), the control unit 30 executes the following process (step SA5). That is, in step SA5, the control unit 30 refers to the error management database DB1, and thereby specifies a record set including a piece of error identification information J1 having the same value as that of a piece of error identification information J1 of the detected error. Here, the specified record set is a record set corresponding to the detected error.

Next, the control unit 30 acquires a piece of error kind information J3 included in the record set having been specified in step SA5, and determines whether the kind of the detected error is the error that does not disable printing or the error that disables printing on the basis of the acquired piece of error kind information J3 (step SA6). In step SA6, the control unit 30 determines that the kind of the detected error is the error that does not disable printing in the case where the value of the piece of error kind information J3 is the value indicating the error that does not disable printing, and the control unit 30 determines that the kind of the detected error is the error that disables printing in the case where the value of the piece of error kind information J3 is the value indicating the error that disables printing. Even when the kind of the detected error is the error that disables printing, in the case where, for example, a factor causing the detected error is within a range of a margin, the control unit 30 can cope with the detected error as the error that does not disable printing.

In the case where the kind of the detected error is the error that does not disable printing (step SA6: "error that does not disable printing"), the control unit 30 executes a process described below (step SA7). Here, in the case where the kind of the detected error is the error that does not disable printing, the printer 1 is capable of executing printing.

That is, in step SA7, the control unit 30 acquires one or more pieces of error coping method information J4, an error log set J5, and a piece of error name information J6 among information included in the record set having been specified in step SA5. Subsequently, the control unit 30 controls the thermal head 2, the transport motor 14, and other components, and thereby prints, at minimum, information based on the one or more pieces of error coping method information J4, information based on the error log set J5, and information based on the piece of error name information J6 on the roll paper 3. Hereinafter, the information based on the one or more pieces of error coping method information J4, the information based on the error log set J5, and the information based on the piece of error name information J6 will be collectively referred to as "error related information".

Figure 6:
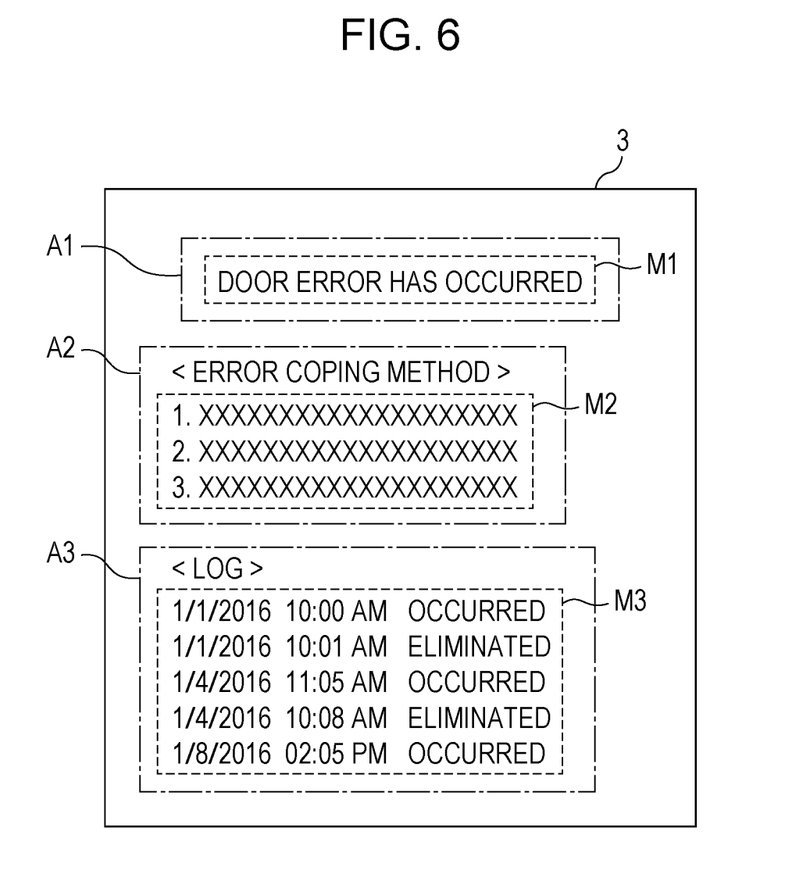
FIG. 6 is a diagram illustrating information printed on roll paper.

FIG. 6 is a diagram illustrating an example of information printed on the roll paper 3 in step SA7.

In FIG. 6, in a region A1, information M1 is printed. This information M1 explicitly indicates the name of the detected error. The control unit 30 prints the information M1 on the basis of the piece of error name information J6.

Further, in FIG. 6, in a region A2, information M2 is printed. This information M2 indicates one or more coping methods for the detected error. The control unit 30 prints the information M2 on the basis of the one or more pieces of error coping method information J4.

Further, in FIG. 6, in a region A3, information M3 is printed. This information M3 indicates one or more logs of the detected error. The control unit 30 prints the information M3 on the basis of the error log set J5. Here, the information printed based on the error log set J5 does not necessarily include information related to all of logs having been recorded in the error log set J5. For example, the information printed based on the error log set J5 may be information in relation to one or more occurrences/eliminations of the error during a certain period backward from the present time.

A user is able to simply and precisely recognize the occurred error by referring to the information being based on the piece of error name information J6 and having been printed on the roll paper 3.

Further, the user is able to simply and precisely recognize one or more coping methods to be applied to eliminate the error, by referring to the information being based on the one or more pieces of error coping method information J4 and having been printed on the roll paper 3. For this reason, the user is able to shorten a time needed to eliminate the error. Further, the printer 1 is configured to print the information based on the one or more pieces of error coping method information J4, and thus, the user is able to recognize the one or more coping methods at a position adjacent to the printer 1. Moreover, the user is able to perform coping one or more processes on the printer 1 in accordance with the one or more coping methods while referring to the information being based on the one or more pieces of error coping method information J4 and having been printed on the roll paper 3.

Further, the user is able to simply and precisely recognize the situation of the occurrence of the detected error, and the like, by referring to the information being based on the error log set J5 and having been printed on the roll paper 3. Further, when the logs are analyzed, a troublesome operation of connecting a terminal including a maintenance software tool installed therein to the printer 1 is unnecessary, and thus, the reduction of loads on user's operation is achieved.

Further, in the present embodiment, the printer 1 does not automatically print the error related information in response to the occurrence of an error, but prints the error related information in the case where, after the occurrence of the error, an instruction for instructing the printing of the error related information has been issued to the host apparatus 100 by a user. With this configuration, the user is able to allow the printer 1 to print the error related information at timing desired by the user. Further, the user is able to cause the printer 1 not to print the error related information when unneeded, and thus, the reduction of unneeded consumption of the roll paper 3 is achieved.

After the execution of the process of step SA7, the control unit 30 allows the processing procedure to proceed to step SA9.

The information having been acquire and printed on the roll paper 3 by the control unit 30 in step SA7 corresponds to the "error information".

Meanwhile, in the case where, in step SA6, the kind of the detected error is the error that disables printing (step SA6: "error that disables printing"), the control unit 30 executes a process described below (step SA8). Note that, in the case where the kind of the detected error is the error that disables printing, the printer 1 is incapable of executing the printing.

That is, in step SA8, the control unit 30 acquires information included in the record set having been specified in step SA5, the information being the piece of error identification information J1, the piece of error occurrence status information J2, the piece of error kind information J3, the one or more pieces of error coping method information J4, and the error log set J5, and the piece of error name information J6. Subsequently, the control unit 30 controls the communication unit 31, and thereby transmits the acquired pieces of information and log set to the host apparatus 100.

The host apparatus 100 receives the pieces of information and log set having been transmitted by the control unit 30 in step SA8. The host apparatus 100 is capable of executing processes described below on the basis of the received pieces of information and log set. That is, the host apparatus 100 is capable of acquiring the piece of error identification information J1. Further, the host apparatus 100 is capable of recognizing the occurrence of the error on the basis of the piece of error occurrence status information J2. Moreover, the host apparatus 100 is capable of recognizing the kind of the detected error on the basis of the piece of error kind information J3, and thereby is capable of recognizing that the printer 1 is in a state of being incapable of printing.

Further, the host apparatus 100 is capable of displaying information corresponding to the information having been printed on the roll paper 3 by the printer 1 in step SA7, on the basis of the one or more pieces of error coping method information J4, the error log set J5, and the piece of error name information J6. Even though the printer 1 is in the state of being incapable of executing the printing, a user is able to simply and precisely recognize the occurred error by referring to the information having been displayed on the display means of the host apparatus 100. Further, the user is able to simply and precisely recognize one or more coping processes to be applied to eliminate the error. For this reason, the user is able to shorten a time needed to complete the elimination of the error.

After the process of step SA8, the control unit 30 allows the processing procedure to proceed to step SA9.

The information that is acquired and transmitted to the host apparatus 100 by the control unit 30 in step SA8 corresponds to the "error information".

In step SA9, the control unit 30 monitors whether or not the elimination of the detected error has been detected by the error detection unit 41.

When having determined, in step SA9, that the elimination of the detected error has been detected by the error detection unit 41 (step SA9: YES), the control unit 30 allows the processing procedure to proceed to SA10.

In step SA10, the control unit 30 moves the operation state from the offline state to the online state.

Further, when having moved the operation state from the offline state to the online state, the control unit 30 communicates with the host apparatus 100 by controlling the communication unit 31, and thereby notifies the host apparatus 100 of the movement to the online state.

Upon reception of the notification for notifying the movement to the online state, the host apparatus 100 executes processes described below. That is, the host apparatus 100 moves to a state in which each of the normal command and the real-time command is allowed to be transmitted to the printer 1. Moreover, the host apparatus 100 inquires of a user whether or not printing of information in relation to the logs of the detected error is to be performed. The inquiry may be made in any method. Upon reception of input from the user for instructing the execution of the printing of the information in relation to the logs of the detected error, the host apparatus 100 generates a normal command for instructing the execution of the printing of the information in relation to the logs of the detected error and transmits the generated normal command to the printer 1 (this normal command being referred to as a "log related normal command" hereinafter).

After the movement to the online state, upon reception of a control command from the host apparatus 100, the control unit 30 executes processing based on the received control command. Concurrently therewith, the control unit 30 determines whether or not the log related normal command has been received (step SA11).

When having confirmed that the log related normal command has been received (step SA11: YES), the control unit 30 executes processes described below (step SA12). That is, the control unit 30 acquires an error log set J5 included in a record set corresponding to the detected error (this record set being the record set having been specified in step SA5 in the case where the present state is a state after the execution of the process of step SA5). Next, based on the acquired error log set J5, the control unit 30 allows information based on the error log set J5 to be printed on the roll paper 3 by controlling the thermal head 2, the transport motor 14, and other components.

Though the reference to the information having been printed on the roll paper 3, with respect to the detected error, the user is able to recognize the elimination of the detected error, and further is able to simply and precisely recognize the past occurrence situations of the detected error.

The information having been acquired and printed in SA12 corresponds to the "log information".

It should be noted here that, in the present embodiment, the log related normal command is not the real-time command, but is the normal command. This is because of the following reasons. That is, the timing when the log related normal command is transmitted is timing in a state in which the detected error is already eliminated. Thus, the printer 1 is in a state of being capable of executing processes in relation to operations, such as an operation of issuing a receipt. For this reason, the priority of the printing of logs in relation to the detected error is not necessarily high, compared with the priority of any other process. Based on this reason, the log related normal command is handled as a normal command, and this handling prevents the execution of a process having a high priority, compared with the printing of the information in relation to logs, from being delayed due to the execution of the printing of the information in relation to logs, and thus, the above handling increases the convenience of a user.

Note that the control unit 30 may be configured to, along with the printing of the information on the roll paper 3, or instead of the printing of the information on the roll paper 3, transmit the information in relation to the logs of the detected error to the host apparatus 100 by controlling the communication unit 31. This configuration enables the host apparatus 100 to perform processes, such as a process of displaying the logs of the detected error, on the basis of the information having been received.

As described above, the printer 1 (the "printing apparatus") according to the present embodiment includes the detection unit 41 (the "detection unit"), which detects an error; the storage unit 39, which stores therein error information corresponding to the error; the communication unit 31, which communicates with the host apparatus 100 (the "external apparatus"); the printing unit, which performs printing on the roll paper 3 (the "printing medium"); and the control unit 30. Upon detection of an error by the error detection unit 41, the control unit 30 moves to the offline state, in which the communication unit 31 receives the real-time command (the "first command") and does not receive the normal command (the "second command"). Further, upon reception of the error related real-time command, which is the real-time command, by the communication unit 31 in the offline state, the control unit 30 determines whether the error is the error that does not disable printing (the "first error"), which does not disable the printing by the printing unit, or the error that disables printing (the "second error"), which disables the printing by the printing unit. Further, in the case where a result of the determination is that the error is the error that does not disable printing, the control unit 30 acquires the error information from the storage unit 39 and allows the printing unit to print the error information, and in the case where a result of the determination is that the error is the error that disables printing, the control unit 30 acquires the error information from the storage unit 39 and allows the communication unit 31 to transmit the error information to the host apparatus 100.

With this configuration, upon occurrence of an error, the printer 1 enables, without automatically printing the error information, the printing of the error information to be executed at timing when the printer 1 has received the error related real-time command from the host apparatus 100, on the basis of an instruction by a user. Further, the printer 1 enables the error information to be output in a method based on which of the error that does not disable printing and the error that disables printing the error is.

Further, in the present embodiment, the error information includes one or more coping methods for the detected error.

With this configuration, a user is able to simply and precisely recognize the one or more coping methods for the detected error and cope with the detected error, by referring to the printed information.

Further, in the present embodiment, the error information includes log information in relation to the detected error.

With this configuration, a user is able to simply and precisely recognize the log information in relation to the detected error and execute a coping process, by referring to the printed information.

Further, in the present embodiment, upon detection of the recovery of an error (the elimination of an error) by the error detection unit 41, the control unit 30 moves to the online state (the second state), in which the communication unit 31 receives the real-time command and the normal command, and upon reception of the log related normal command, which is the normal command, by the communication unit 31, the control unit 30 acquires the log information from the storage unit 39, and allows the printing unit to print the log information or allows the communication unit 31 to transmits the log information to the host apparatus 100.

With this configuration, after the elimination of the error of the printer 1, a user is able to simply and precisely recognize logs in relation to the eliminated error.

It should be noted that the aforementioned embodiment absolutely shows one embodiment of the invention, and any modification and/or any application within the scope of the invention can be made.

For example, in the aforementioned embodiment, with respect to logs, the printer 1 is configured to print logs in relation to a detected error on the roll paper 3. In this case, however, the printer 1 may be configured to print, as logs, not only the logs in relation to the detected error, but also logs in relation to other events. For example, the printer 1 may be configured to print logs on the basis of the above-mentioned operation logs.

Further, for example, each of the function blocks shown in FIG. 3 does not suggest a specific hardware configuration, and can be achieved optionally in a form that allows hardware and software to collaborate with other. Further, each of the units may execute its processing by executing a program stored in an externally-connected storage medium.

Further, for example, in the aforementioned embodiment, the printer 1 is a thermal line printer. The printing method for the printer 1, however, is not necessarily such a thermal printing method, and may be a different printing method, such as an ink jet printing method or a dot impact printing method.

What is claimed is:

1. A printing apparatus comprising:
a detection unit configured to detect an error;
a storage unit configured to store in itself error information corresponding to the error;
a communication unit configured to communicate with an external apparatus;
a printing unit configured to perform printing on a printing medium; and
a control unit configured to:
set, responsive to detection of an error by the detection unit, the communication unit to a first state in which the communication unit is configured to receive a first command and is not configured to receive a second command;
determine, responsive to reception of the first command by the communication unit in the first state, whether the detected error is a first error type that does not disable the printing or a second error type that disables the printing;
acquire the error information from the storage unit and control the printing unit to print the error information in a case where a result of the determination is that the detected error is the first error type; and
acquire the error information from the storage unit and allow the communication unit to transmit the error information to the external apparatus in a case where the result of the determination is that the detected error is the second error type,
wherein the error information includes log information related to the detected error,
wherein the control unit is configured to set, responsive to detection of recovery from the detected error by the detection unit, the communication unit to a second state in which the communication unit is configured to receive the first command and the second command, and
wherein the control unit is configured to acquire the log information from the storage unit responsive to reception of the second command by the communication unit in the second state, and to allow the printing unit to print the log information or allow the communication unit to transmit the log information to the external apparatus.

2. The printing apparatus according to claim 1, wherein the error information specifies a coping method for the detected error.

3. A control method for a printing apparatus including a control unit for performing printing on a printing medium, the control method comprising:
responsive to detection of an error, setting the printing apparatus to a first state in which the printing apparatus is configured to receive a first command and in which the printing apparatus is not configured to receive a second command;
responsive to reception of the first command in the first state, determining whether the detected error is a first error type that does not disable the printing or a second error type that disables the printing;
responsive to a result of the determination being that the detected error is the first error type, acquiring error information corresponding to the detected error type and including log information related to the detected error, and printing the error information, or responsive to a result of the determination being that the detected error is the second error, acquiring the error information and transmitting the error information to an external apparatus;
setting, responsive to detection of recovery from the detected error by the detection unit, the printing apparatus to a second state in which the printing apparatus is configured to receive the first command and the second command; and
acquiring the log information responsive to reception of the second command, and printing the log information or transmitting the log information to the external apparatus.

* * * * *